Figure 1:
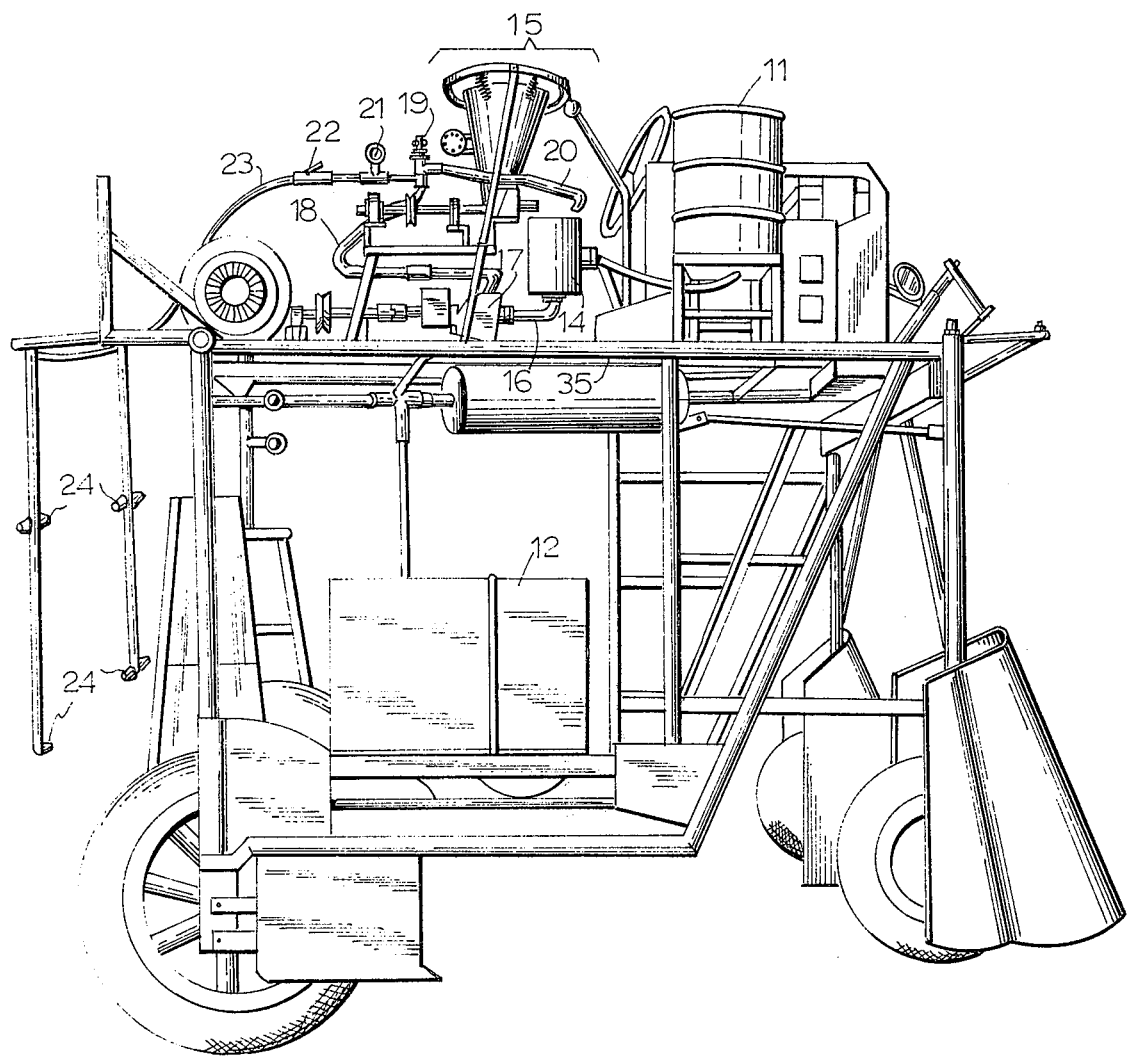
Figure 2:
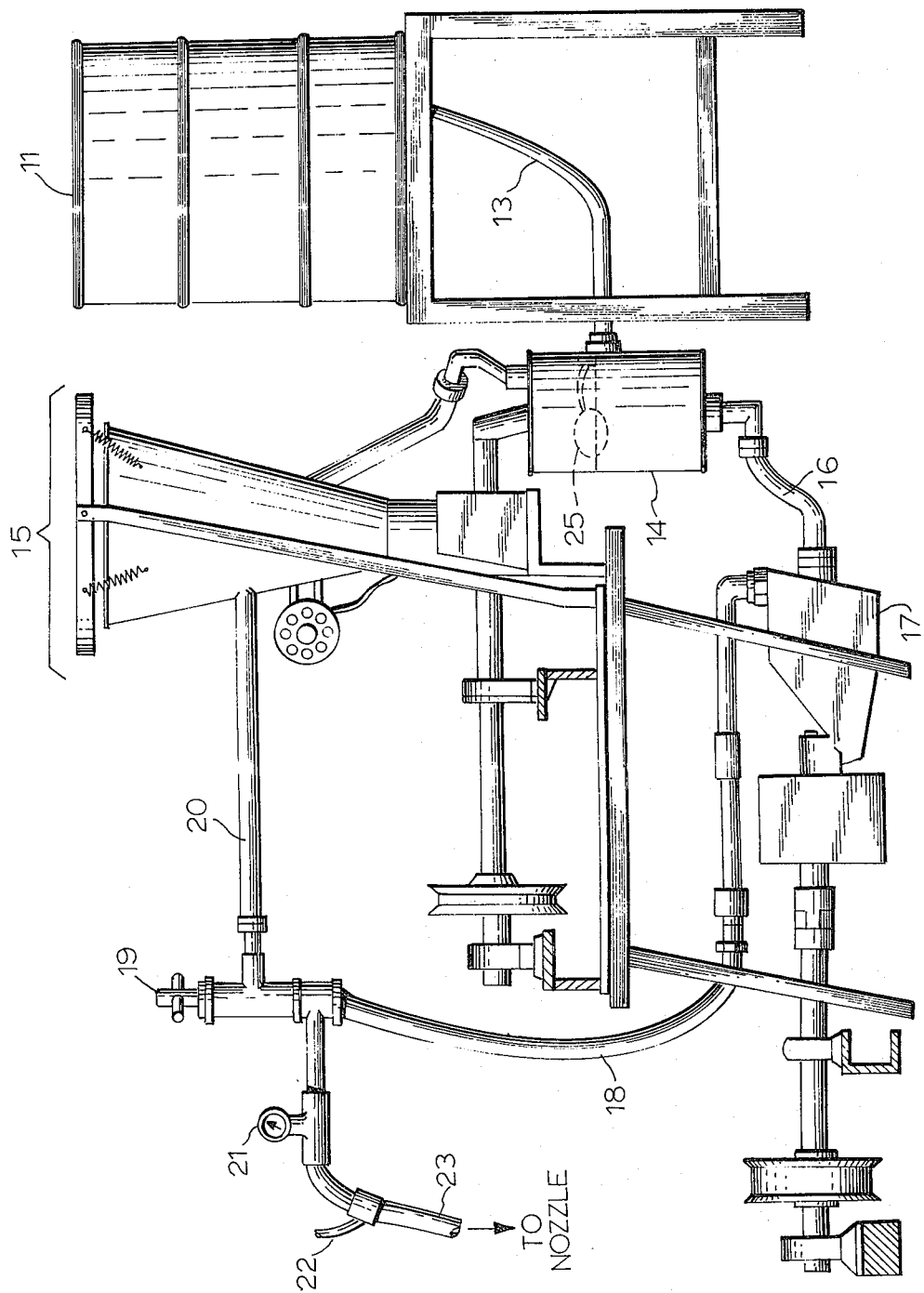
Figure 3:
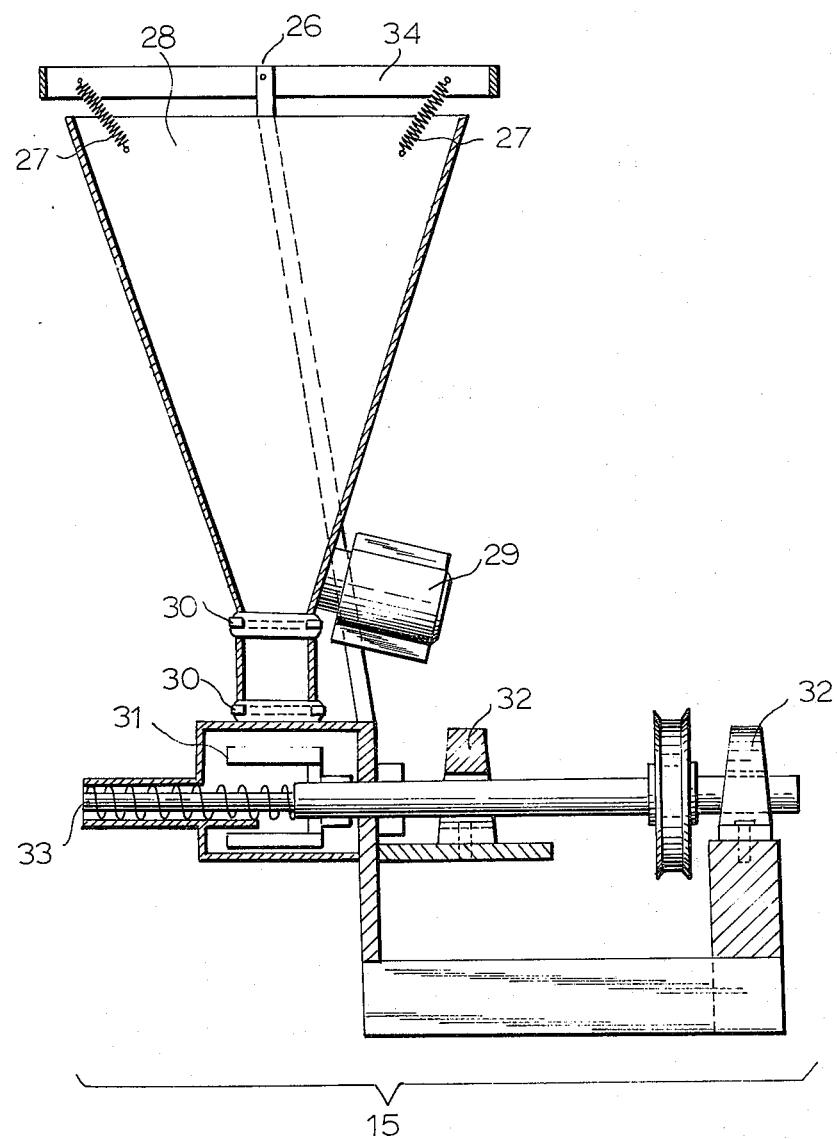

United States Patent [19]

Harrell et al.

[11] 3,926,371

[45] Dec. 16, 1975

[54] APPARATUS AND SYSTEM FOR MIXING PESTICIDE WITH WATER CONCURRENTLY WITH SPRAYING

[75] Inventors: Edsel A. Harrell; Woodrow W. Hare; John R. Young, all of Tifton, Ga.

[73] Assignee: The United States of America as represented by the Secretary of Agriculture, Washington, D.C.

[22] Filed: Sept. 17, 1974

[21] Appl. No.: 506,932

[30] Foreign Application Priority Data

Sept. 18, 1973 Germany............................ 2346818

[52] U.S. Cl. ................ 239/146; 239/159; 239/304; 239/407

[51] Int. Cl.².. A01G 25/09; B05B 9/02; B05B 1/20; A62C 13/60

[58] Field of Search ............ 239/146, 159, 304, 407

[56] References Cited
UNITED STATES PATENTS

| | | | |
|---|---|---|---|
| 3,074,822 | 1/1963 | Walk et al. | 239/146 |
| 3,086,713 | 4/1963 | Moldenhauer | 239/159 |
| 3,140,050 | 7/1964 | Elmore | 239/304 |
| 3,380,658 | 4/1968 | Stasz et al. | 239/146 |
| 3,680,786 | 8/1972 | Levy | 239/146 |
| 3,683,547 | 8/1972 | Harden | 239/146 |

*Primary Examiner*—Lloyd L. King
*Attorney, Agent, or Firm*—M. Howard Silverstein; Max D. Hensley

[57] ABSTRACT

A new apparatus and system for mixing pesticides with water concurrently with spraying is disclosed. Pesticide and water are metered into a mixing reservoir in a continuous process. The mixed solution is transferred by means of a pump to a pressure regulator and then dispensed through a set of nozzles onto rows of plants. The mixing action of the pesticide is attained in the mixing reservoir by recycle of a percentage of the pesticide solution from the pressure regulator. Concentrations of pesticide are set by empirical tests and balanced between the dry pesticide metering device which is an auger and the recycle solution. The dry pesticide is fed into the metering chamber by a vibrating device and gravity feed. The density of the dry pesticide is controlled in the pesticide dispensing chamber by a mechanical agitator which whips air into the dry pesticide. The water is fed into the mixing reservoir by gravity feed and controlled by a mechanical float valve.

8 Claims, 3 Drawing Figures

APPARATUS AND SYSTEM FOR MIXING PESTICIDE WITH WATER CONCURRENTLY WITH SPRAYING

This invention relates to crop spraying machinery. More specifically, this invention relates to a new apparatus and method for mixing pesticides with water concurrently with spraying.

In the prior art the literature teaches the mixing of pesticides with water and then spraying. Pesticides which are miscible or emulsifiable in water present minimum problems. However, some pesticides are neither water miscible nor easily emulsified in water. In these cases manufacturers of pesticides must develope products that will mix with water to form a satisfactory sprayable solution or add additional chemical agents to accomplish this objective.

Notwithstanding the additional treatment, some pesticide products are still difficult to spray with commercial field sprayers which are usually equipped with agitation devices (mechanical, hydraulic, or both) in the solution reservoir. Furthermore, a critical problem occurs if it becomes necessary for some reason to stop the equipment and the pesticide settles out of the solution. It is almost impossible to restore it to a satisfactory sprayable condition.

A heretofore proposed method mixed pesticides with water concurrently with spraying by forming a slurry and then mixing the slurry with water through a venturi. Significant disadvantages in this method are: (1) the venturi limits the spray pressure at the nozzles and (2) the slurry mixing requires a mixer.

Prior art also teaches that different insects require different concentrations of active pesticides. Sprayer speeds and active homogeneous concentrations of pesticides on target are therefore critical factors which must be varied for efficient insect control. Heretofore proposed methods and equipment lacked this versatility.

The main objective of this invention is to provide an apparatus and a method suitable to properly mix pesticides with water concurrently while spraying.

Another object of the present invention is to eliminate pesticide mixtures in reservoirs on sprayers.

A third object of this invention is to meter the pesticides so that sufficient active material is placed on the target to compensate for different insects, sprayer speeds, and concentrations of active materials in the pesticides.

A fourth objective of this invention is to eliminate the need of agents used to make the pesticides mix with water to form a sprayable solution.

A fifth object of this invention is to reduce the hazards of mixing and transporting of large quantities of pesticides and water mixtures.

A sixth objective of this invention is to reduce operating costs by eliminating the need to make pesticides sprayable.

Other objects and advantages of this invention will further become apparent hereinafter and in the drawings, in which:

FIG. 1 is a pictorial view of the sprayer as used for spraying sweet corn.

FIG. 2 is a view of the salient components of this invention illustrating the important details.

FIG. 3 is a cut-away view of the dry metering unit.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

Turning now to the specific embodiment of the invention selected for illustration in the drawings, the number 11 designates a water reservoir. On commercial sprayers this tank is used for holding sprayable solution. Water is placed in reservoir 11 which is connected to mixing tank 14 by use of a flexible hose 13. The mixing reservoir 14 has a constant level of water which is maintained by float valve 25.

Dry pesticides are placed in pesticide reservoir 28. The dry pesticide ingredients are metered into the mixing tank 14 by a metering system 15. A cross-sectional view of the metering system 15 is shown in FIG. 3. Dry pesticides are placed in pesticide reservoir 28, and retaining ring 34 is secured and held tightly in place around the periphery of pesticide reservoir 28 by tension springs 27. Reservoir 28 is supported firmly by brace 26 at the top, and attached at the bottom to metering unit 14 by claims 30.

The pesticide is mechanically metered into the mixing unit 14 by action of auger 33 and vibrator 29. The volume of pesticide material metered into mixing unit 14 is controlled by the speed of auger 33. A constant density of pesticide for metering by the auger is maintained by fingers 31. Vibrator 29 is attached to the external wall of reservoir 28 to vibrate the material into the auger chamber and prevent clogging or binding of the dry pesticide.

The metering unit 15 may be driven from the conveyance power system 35 but a variable speed drive must be used since the drive regulates the speed of auger 33 which governs the output of the material from the metering unit.

The operational speed is determined empirically by calibrating the metering unit to meter the pesticide at a rate to place sufficient pesticide on the target to control the pest. Standard calibrating procedures for sprayers can be used. Important parameters for establishing operating speeds are: (1) the species of pest or insect to be controlled (2) active ingredient required to control the pest or insect (3) amount of active ingredient in pesticide used (4) sprayer pressures and volumes (5) size and number of spray nozzles (6) number of rows to be sprayed in a swath. Experimental tests for the instant invention covered a 4-row swath, but it could easily be expanded to cover 8 or 16 row swaths simply by increasing the boom length and adding additional nozzles and recalibrating and rebalancing the operating parameters.

Thus after calibrating and setting speed of metering unit 15, the sprayer is ready for spraying. Pump 17 and metering unit 15 are energized. Pesticides are metered into mixing reservoir 14 by metering unit 15. The pesticide solution is picked up from mixing reservoir 14 by pump 17 through suction hose 16. Pump 17 discharges through pressure hose 18 which is attached to pressure regulator 19. Pressure regulator 19 has two discharge outlets. One discharge outlet goes to the sprayer nozzles and the other discharge outlet recycles overflow pesticide solution back to mixing reservoir 14 through flexible pressure hose 20. The recommended pressure and volume at the nozzles 24 may be maintained by adjusting pressure regulator 19. Gauge 21 is provided for a constant pressure indicator. Valve 22 is a positive on-off valve to control sprayable solution to nozzles 24 through hoses 23. Nozzles 24 delivers the pesticide solution to the target area.

The recycle system from pressure regulator 19 performs multiple functions. First it allows excess pesticide solution not needed for spraying to be returned to the mixing reservoir 14. This is a very desirable feature since the return soltuion is used to break the surface tension of the water allowing for thorough mixing of the dry pesticide with the water. The force of the return spray under pressure also provides the actual agitation and mixing action needed in the mixing reservoir. Therefore, it becomes necessary to maintain an optimum ratio of solution recycled to solution which is sprayed. It has been determined emperically that the minimum ratio of return solution to sprayed solution is in a ratio of 5:1 by volume. The optimum ratio is 10:1.

Upon energizing metering unit 15 and pump 17, the time required to have a sprayable solution is 37 seconds. This is the amount of time necessary to meter pesticide into the water in mixing reservoir 14, prime pump 17, and fill hoses 16, 18, and 20.

To stop the sprayer for short periods of time, close valve 22 and stop metering unit 15. Float valve 25 will maintain the proper water level in mixing reservoir 14. Recycling the pesticide solution will maintain the sprayer ready for spraying. After discontinuing spraying operations, the entire system should be drained and flushed thoroughly of pesticide solution.

It is to be understood that the form of the invention herewith shown and described is to be taken as a preferred embodiment. Various changes may be made. For example pump 17 may be of any of the commercially available pumps used for pumping pesticides. The centrifugal pump is ideal because it can operate against a closed system without damage. A roller, piston, or diaphram pump may be used satisfactorily as the pressure regulator 19 maintains pressure at the desired setting by passing overflow solution through hose 20 into mixing reservoir 14.

If the hoses to the nozzle are short, there is no need for additional mixing in the lines. However, if the lines are long, a static mixer (not shown in the illustrative drawings) may be placed in the lines. It was determined experimentally during testing of the instant invention that uniform concentrations of pesticide solution could be achieved through the spray nozzles without a static mixer.

Having thus described our invention we claim:

1. A system for mixing pesticides with water concurrently with spraying and comprising in combination:

a. a means of storing water for mixing with pesticide
b. a means for storing pesticide connected to
c. a mixing chamber for mixing pesticide with water into a homogeneous sprayable solution of proper concentration comprising:
   1. a positive water level control apparatus capable of controlling the water level in the mixing chamber to a preset condition and communicating with the said water storage means through a flexible connection
d. a means of dispensing the pesticide in accurately measured continuous quantity and a means of transferring said pesticide to said mixing means
e. a means of transferring the mixed pesticide solution from said mixing means to
f. a pressure regulator comprising:
   1. a pressure control apparatus
   2. an inlet
   3. a dual outlet comprising:
      a. a recycle means communicating between the pressure regulator and the mixing means
      b. an outlet means communicating between the pressure regulator and a set of spray nozzles, said outlet having an on-off positive control means located to function between the pressure regulator and the spray nozzles to allow for flow control of the pesticide solution and the material of the said outlet means possessing a flexible characteristic.

2. The system as defined in claim 1 wherein the positive water level control apparatus in the mixing tank is a float valve.

3. The system as defined in claim 1 wherein the means of dispensing the pesticide in accurately measured continuous quantities comprises:

a. a connical storage reservoir substantially in the configuration of a funnel affixed at the lower end to a dispensing chamber by clamps and secured at the top periphery by
   1. a retaining ring designed to overlap the top periphery of the connical storage reservoir the full circumference thereof, and the said retaining ring affixed to
   2. a metal brace which is affixed to a frame thereby lending rigid support
b. a vibrating apparatus affixed to the outer surface of the pesticide storage reservoir functioning to maintain a constant and trouble free flow of pesticide to the dispensing chamber,
c. a dispensing chamber comprising:
   1. A horizontal auger for mechanical flow of dry pesticide extending through a side wall of the dispensing chamber, said auger extension encased in
      a. an external horizontal cylinder open on both ends to allow for transfer of dry pesticide material, said cylinder affixed to the dispensing chamber, with the internal end of the auger attached to one end of
   2. a horizontal shaft extending through the opposite wall of the dispensing chamber with respect to the auger extension, said shaft mounted in a bushing where it passes through the wall of the dispensing chamber and then by two external mountings affixed to a frame, said horizontal shaft having a pully located between the two external mountings, said pulley imparting rotation to the shaft and auger, and the shaft also having a dry pesticide density control apparatus attached to the outer circumference of the end of the shaft which is located in the dispensing chamber.

4. The apparatus as defined in claim 3 wherein the density apparatus which controls the density of the dry pesticide in the dispensing chamber comprises:

a. a dual membered horizontal metal device, paralleling the shaft and auger, and of sufficient length to allow for clearance of the internal walls of the dispensing chamber, and off-set on one end at ninty degrees and affixed at said off-set end to the external surface of the shaft thereby taking on substantially the configuration of a fork so as to beat and mix the dry pesticide as a result of the turning of the shaft.

5. The apparatus as defined in claim 1 wherein the recycle means is a flexible hose connecting the pressure regulator and the mixing reservoir.

6. The apparatus as defined in claim 1 wherein the positive control means is an on-off valve.

7. The apparatus as defined in claim 1 wherein the means of transferring the pesticide to the mixing reservoir is a flexible hose.

8. The apparatus as defined in claim 1 wherein the means of transferring the mixed pesticide solution from the mixing reservoir to the pressure regulator is a centrifugal pump connected to the pressure regulator and the mixing reservoir by flexible hose.

* * * * *